June 4, 1963  C. O. ANDERSON  3,091,840
ROLLER CHAIN SPRING PLIERS
Filed May 2, 1960
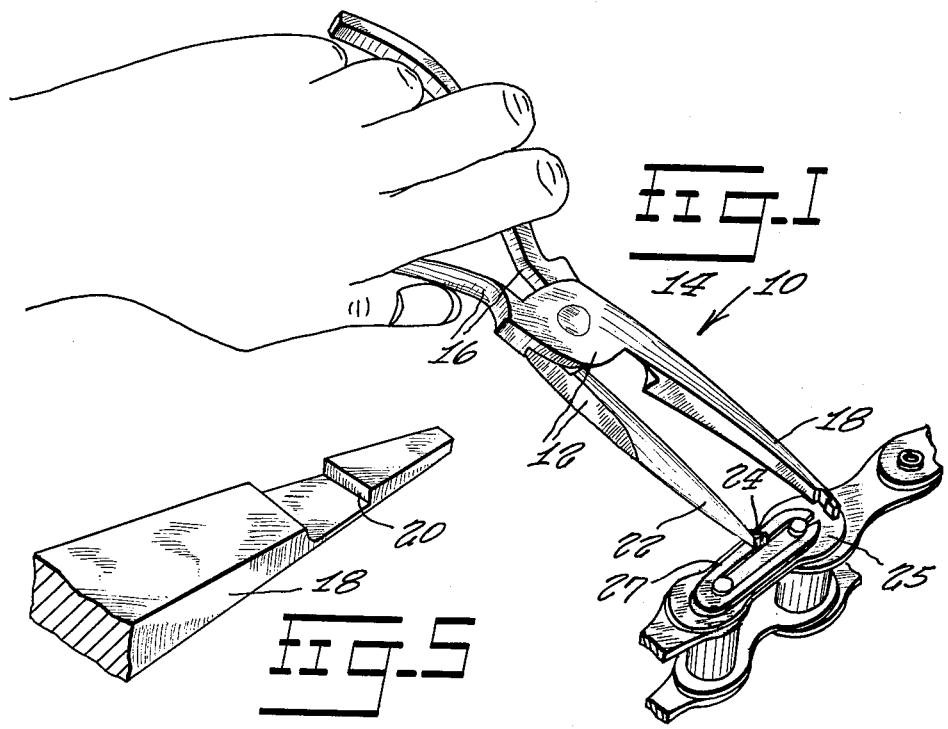
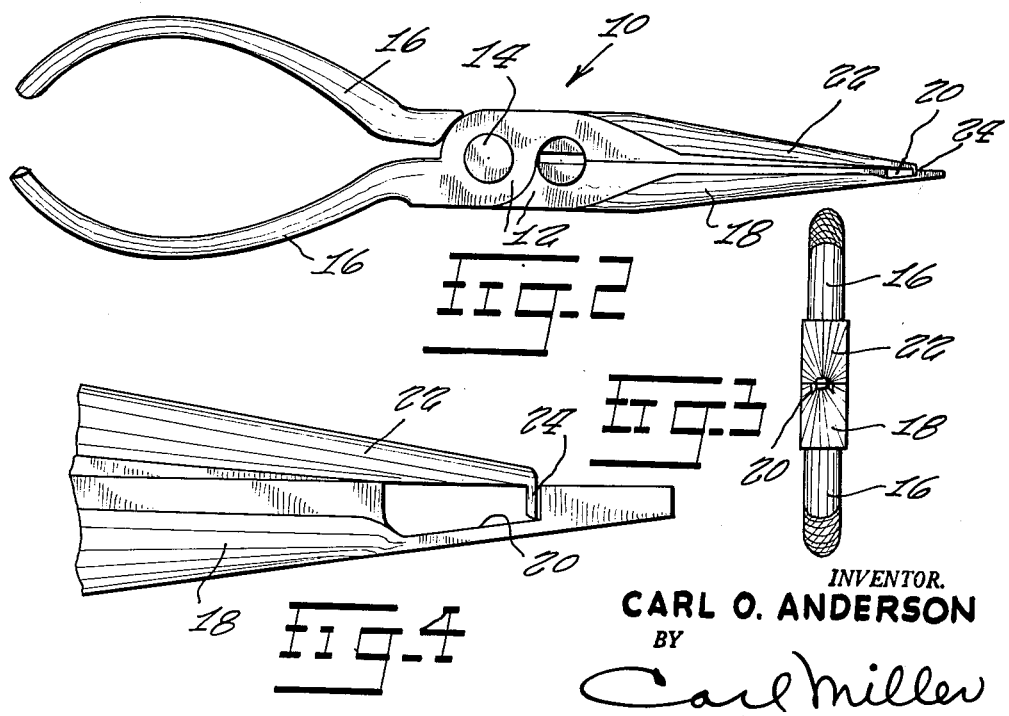
INVENTOR.
CARL O. ANDERSON
BY
Carl Miller
ATTORNEY

United States Patent Office 3,091,840
Patented June 4, 1963

3,091,840
ROLLER CHAIN SPRING PLIERS
Carl O. Anderson, 806 58th St., Brooklyn, N.Y.
Filed May 2, 1960, Ser. No. 26,370
1 Claim. (Cl. 29—225)

This invention relates to tools and more particularly to a hand tool.

Ordinarily, it is necessary to use a sharp instrument for dislodging a spring from a roller chain link assembly. This is not only time consuming, difficult, and inconvenient, but also endangers the person attempting to remove the spring in this manner since a slip of the instrument can result in injury. It is therefore an object of the present invention to provide a special purpose spring pliers for use with roller chain springs which is extremely simple in construction, efficient in operation, and which will overcome the aforementioned difficulties.

A further object of the present invention is to provide a manual tool of the type described which may be used with a minimum amount of skill, experience, and practice, and which will assure the safe and effective removal of all types of roller chain springs in a minimum amount of time.

All of the foregoing and still further objects and advantages of this invention will become apparent from a study of the following specification, taken in connection with the accompanying drawing, wherein:

FIGURE 1 is a perspective view of a roller chain spring pliers made in accordance with the present invention in actual use;

FIGURE 2 is a plan view of the tool shown in FIGURE 1;

FIGURE 3 is a front end view of the assembly shown in FIGURE 2;

FIGURE 4 is an enlarged fragmentary plan view of certain parts of the assembly shown in FIGURE 2; and FIGURE 5 is an enlarged fragmentary perspective view of certain operating parts of the present invention.

Referring now to the drawing, a roller chain spring pliers 10 made in accordance with the present invention is shown to include a pair of handles 16 hingedly connected together by means of a bearing stud 14. Each one of the handles 16 includes a rigid shank 12, both of such shanks being movable toward each other in response to a squeezing action upon the handles 16.

One of the shanks 12 is supplied with a nose 18 having a cutout or indent 20 spaced inwardly from its outermost end. The other one of the shanks 12 is provided with a similar but shorter nose 22 having a terminal flange 24 receivable within the indent 20 in the other nose 18 in response to a squeezing action upon the handles 16.

In actual use, the pliers are held so that an outside edge of the chain link 25 is received within the indent 20, with the terminal flange 24 engaging an inside edge of the spring 27 to be removed. By then squeezing the handles 16 together, the flange 24 at the one end of the nose 22 will move the adjacent side of the spring 27 toward the adjacent edge of the chain link 25, thus allowing the spring to be disengaged from the bearing posts of the chain. Thus, the tool may be used in a convenient and safe manner with a minimum amount of effort and without danger of slipping.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

Roller chain pliers for removing a spring with a split end that overlies a link of a roller chain, from a post of the chain, comprising a pair of pivotally connected handles each having a shank portion and being movable toward the other in response to squeezing action on the handles, a stud pivotally connecting said handles, each of said shank portions terminating in a nose portion on the other side of said stud from the handle, the end of one said nose portions having an indent extending along the longitudinal axis of the nose portion with spaced ends formed by outer and inner wall portions for receiving and holding the end of a link under a split spring end as such split spring end is spread for removal, and the other nose portion terminating in a flange that is insertable into the indent adjacent the outer wall portion and spaced from the inner wall portion and being normal to the longitudinal axis of the nose portion with the indent when the flange is inserted in said indent, said flange being adapted to be forced between the spring and the roller chain post at the split spring end of a roller chain to spread such split spring end when an adjacent link end is retained in the indent with said link acting as a fixed abutment for said plier as it is closed.

References Cited in the file of this patent

UNITED STATES PATENTS

| | | |
|---|---|---|
| 807,240 | Carstensen | Dec. 12, 1905 |
| 942,356 | Shelley | Dec. 7, 1909 |
| 1,290,399 | Stevens | Jan. 7, 1919 |
| 1,454,475 | Hughes | May 8, 1923 |
| 1,475,001 | Dawson | Nov. 20, 1923 |
| 1,953,930 | Dryal | Apr. 10, 1934 |
| 2,783,483 | Seher | Mar. 5, 1957 |
| 2,797,019 | Larson | June 25, 1957 |